United States Patent [19]

Hwang

[11] Patent Number: 5,109,675
[45] Date of Patent: May 5, 1992

[54] VALVE POSITION SENSING CIRCUIT

[75] Inventor: Edward Y. C. Hwang, Winter Park, Fla.

[73] Assignee: Westinghouse Electric Corp., Pittsburgh, Pa.

[21] Appl. No.: 597,949

[22] Filed: Oct. 10, 1990

[51] Int. Cl.$^5$ .............................................. F01K 13/02
[52] U.S. Cl. ........................................ 60/660; 60/646; 251/129.04
[58] Field of Search ...................... 60/646, 657, 660; 251/129.04

[56] References Cited

U.S. PATENT DOCUMENTS

| 4,554,788 | 11/1985 | Hwang et al. | 60/646 |
| 4,658,590 | 4/1987 | Higashi et al. | 60/660 |
| 4,878,348 | 11/1989 | Fridsma | 60/660 |
| 4,976,108 | 12/1990 | Binstock et al. | 60/660 |

Primary Examiner—Allen M. Ostrager
Attorney, Agent, or Firm—K. Bach

[57] ABSTRACT

The present invention provides a method and corresponding apparatus for detecting open and short circuit faults in a valve position sensor. According to one aspect of the invention, a fuel or steam valve (2) in a turbine system is automatically opened and closed by a positioner/sensor combination (1, 36, 32). In the event a fault occurs in the position sensing circuitry, a fault signal is immediately produced which allows appropriate action to be taken, e.g., closing the valve, before the turbine is damaged.

18 Claims, 2 Drawing Sheets

VALVE POSITION SENSING CIRCUIT

BACKGROUND OF THE INVENTION

1. Field of the Invention

The present invention relates generally to valve positioners such as are used in turbine systems. More particularly, the present invention relates to a method and corresponding apparatus for sensing a valve's position and detecting faults in the valve position sensing circuitry.

2. Description of the Prior Art

A conventional valve positioner (as used to, e.g., automatically control the flow of fuel or steam to a turbine) controls the movement of the valve by measuring the valve's position and comparing the measured valve position with a predefined setpoint. The valve is moved toward an open position if the measured position is less than the setpoint, and toward a closed position if the measured position is greater than the setpoint. This process is continued until the measured position is equal to the setpoint.

A problem with known positioners arises where a short or open circuit, due to, e.g., a loose or intermittent connector in the position sensing circuitry, causes the measured position to always be less than the setpoint. This causes the positioner to continually move the valve toward its fully open position. Known methods of fault detection involve detecting an excessive mismatch between the measured valve position and the predefined setpoint. A disadvantage with these prior art methods is that they introduce a time delay to allow for sluggish actuator response. Thus, when a fault occurs (in, e.g., the position sensing circuitry) the setpoint must be reduced to prevent the positioner from running out of control. However, due to the above-mentioned time delay, these methods are slow in responding to the detected faults. Thus, for example, in a turbine system, the turbine could be damaged by an excessive flow of fuel or steam before a fault in the valve position sensor is detected, and the valve accordingly closed (or prevented from opening further).

It is therefore an object of the present invention to provide a simple and reliable means of immediately detecting faults in the valve position sensing circuit. In addition, the means employed should require a minimal amount of additional circuitry beyond that which is necessary to detect the valve's position. The present invention achieves these objectives.

SUMMARY OF THE INVENTION

According to a first embodiment of the invention, an apparatus for sensing the position of a valve and providing an immediate indication of a fault in the position sensor comprises means, coupled to the valve, for generating a pair of linear signals each having an amplitude dependent upon the position of the valve. According to the invention, a sum of the linear signals remains substantially constant, i.e., within a predefined range of values, in the absence of a fault, but deviates from the predefined range when a fault is present. This sum defines a fault detection signal, which is computed by processing means for summing the linear signals and determining whether a fault exists based upon a comparison of the sum with the predefined range. If a fault exists, a fault signal is provided to a user or automatic controller. The controller, coupled between the processing means and the valve and responsive to the fault signal, automatically controls the position of the valve in accordance with a predefined plan.

A specific embodiment of a position sensor according to the present invention comprises a linear variable differential transformer (LVDT) and circuitry for providing a valve position-indicating signal and a second signal indicative of any fault(s) in the position sensor (for example, a short or open circuit in the LVDT). The LVDT comprises a primary winding and dual secondary windings. The secondary windings are electrically and magnetically coupled to the primary winding via a ferrite core which is movably coupled to the valve stem. The mutual inductance between the primary and secondary windings is thus varied in accordance with the position of the valve. The circuitry employs signals induced in the secondary windings to compute the position-indicating and fault-indicating signals.

The electronic circuitry comprises known means for exciting the primary winding with an ac signal. In addition, demodulator means coupled to the secondary windings provide a pair of linear signals (LVDTA and LVDTB) indicative of the rms value of the current induced in the respective secondary windings. The position-indicating signal (VPOSIT) is then derived by forming the sum, VPOSIT=A(LVDTA-LVDTB)+B, where A and B are constants. The fault-indicating signal (VPODET) is derived by computing the sum, VPODET=LVDTA+LVDTB. According to the invention, any deviation of VPODET from a predefined range of values (e.g., the maximum value of LVDTA or LVDTB plus a range of tolerance specific to the exact embodiment of the LVDT) is indicative of a fault in the position sensor.

An alternative embodiment of the invention comprises a turbine system in combination with the valve position sensor described above. The turbine system includes a turbine, a valve for controlling fuel or steam flow to the turbine, an automatic controller for opening and closing the valve, and a valve position sensor according to the invention, as described above. If and when fault in the position sensing circuitry is detected, the valve is automatically controlled in accordance with a predefined plan. This plan will typically include closing the valve, or maintaining the valve in its present position, until the fault can be corrected.

DESCRIPTION OF THE PREFERRED EMBODIMENTS

The preferred embodiments will now be described with reference to the drawings, wherein like numerals represent like elements. The position sensing and fault detecting circuitry is first described with reference to FIGS. 1 and 2. An implementation of the invention in a turbine system is then described with reference to FIG. 3.

Figure 1:
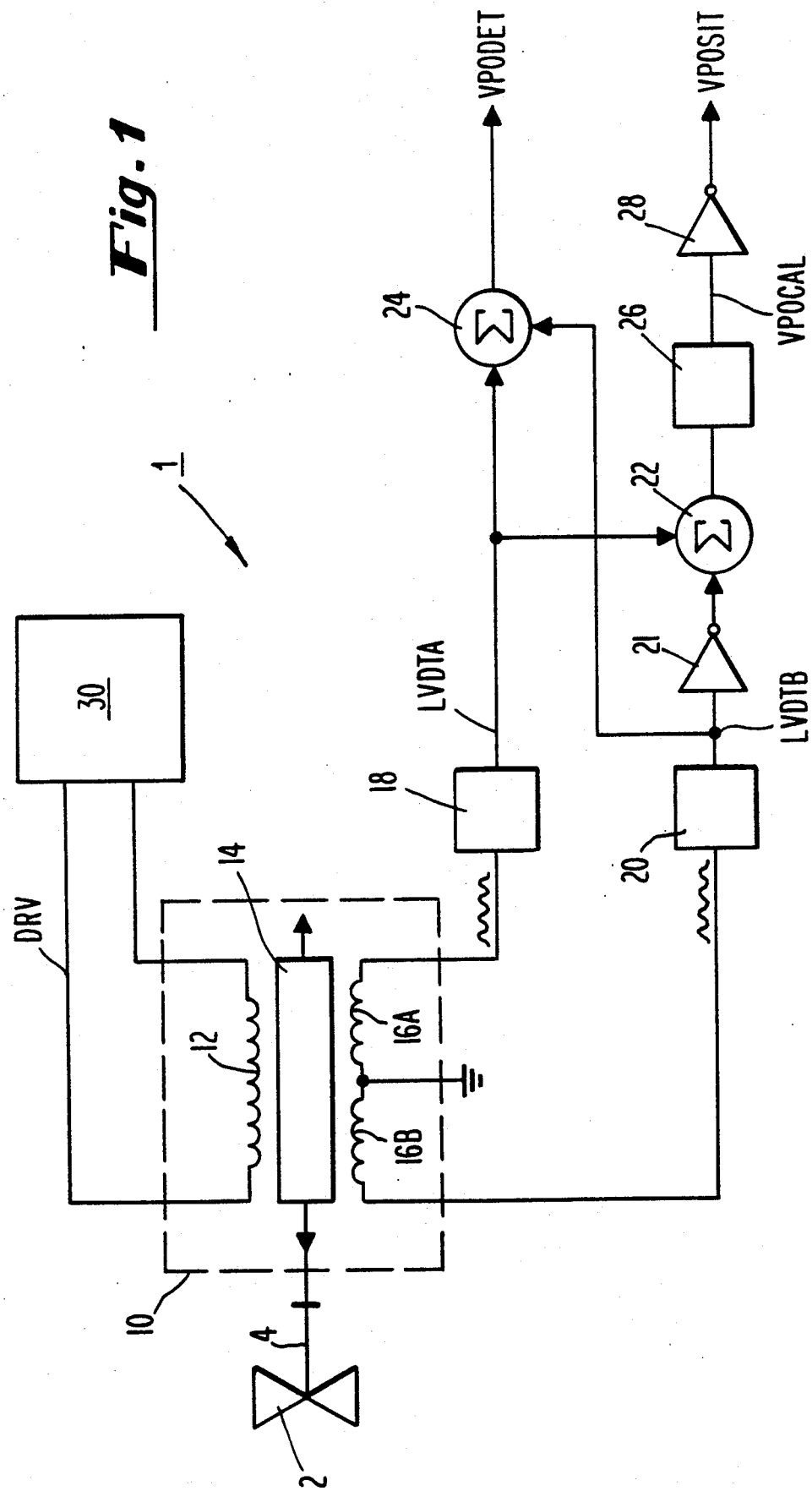
FIG. 1 is a schematic diagram of a valve position sensing circuit in accordance with the present invention.

FIG. 1 illustrates a valve position sensing circuit in accordance with the invention. The invention enables the detection of open, short and partially short circuit faults in the position sensing circuit. According to one embodiment of the invention, a linear variable differential transformer (LVDT) 10 is mounted on the valve stem 4 of a valve 2 such that the movement of its ferrite core 14 is directly proportional to the valve stem's stroking movement. The primary coil 12 is supplied by driver circuit 30 with an ac signal, typically 1-5 KHz, with an amplitude of 15-24 V peak-peak.

Two secondary windings 16A, 16B are magnetically coupled to primary winding 12 via the ferrite core 14 (depending upon the position of the valve 2). Signals induced in the two secondary windings 16A, 16B are demodulated and converted into dc signals by demodulators 18 and 20, respectively. The demodulated and rectified signals produced by demodulators 18, 20, denoted "LVDTA" and "LVDTB" respectively, are proportional to the rms values of the signals induced in secondary windings 16A, 16B.

Figure 2:
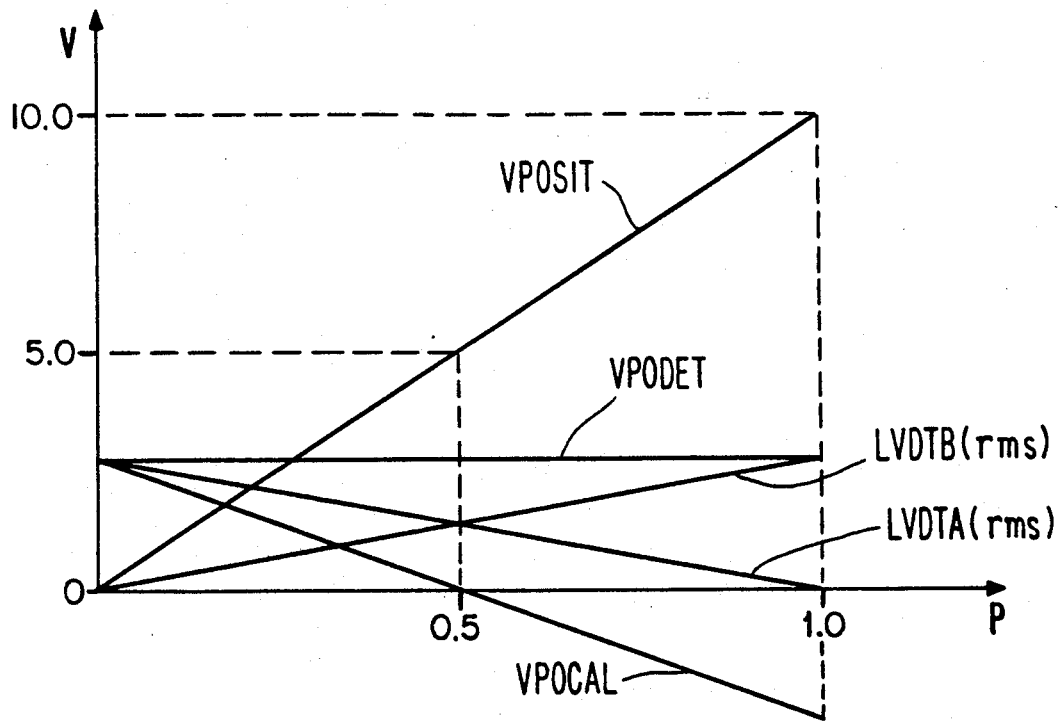
FIG. 2 is a graphical representation of various signals generated by the circuit of FIG. 1.

The signals LVDTA and LVDTB are shown in the graph of FIG. 2. In FIG. 2, the vertical axis represents voltage (V), and the horizontal axis represents the normalized position of the valve (P). As shown, these signals vary linearly between minimum and maximum values (e.g., between 0 and 2.5 volts) as the valve is moved between fully closed and fully open positions. As described below, these signals are combined to produce a position indicating signal ("VPOSIT") and a fault detection signal ("VPODET").

Referring again to FIG. 1, VPOSIT is computed by first inverting LVDTB with inverter 21, and then summing at 22 the inverted signal with LVDTA, thus producing "VPOCAL," which represents the difference between LVDTA and LVDTB (see FIG. 2). The valve position signal, VPOSIT, is obtained by offsetting and scaling at 26, and then inverting at 28, the calibrated position signal VPOCAL. The inverting, offsetting and scaling circuitry is represented by blocks 26, 28 in FIG. 1. Since this circuitry is well known in the art, it is not described in detail herein.

The LVDT fault detection signal VPODET is derived by summing LVDTA and LVDTB in summer 24. As shown in FIG. 2, VPODET is linear and constant for a steady primary excitation signal. This signal can be employed to detect malfunctions of the LVDT position sensing circuit. If VPODET deviates from its normal value (i.e., the maximum value of LVDTA or LVDTB), this indicates a partial short circuit or an internal electronic component that has malfunctioned. This determination is made by additional circuitry for comparing VPODET with a predefined range of values, as described in greater detail below.

Figure 3:
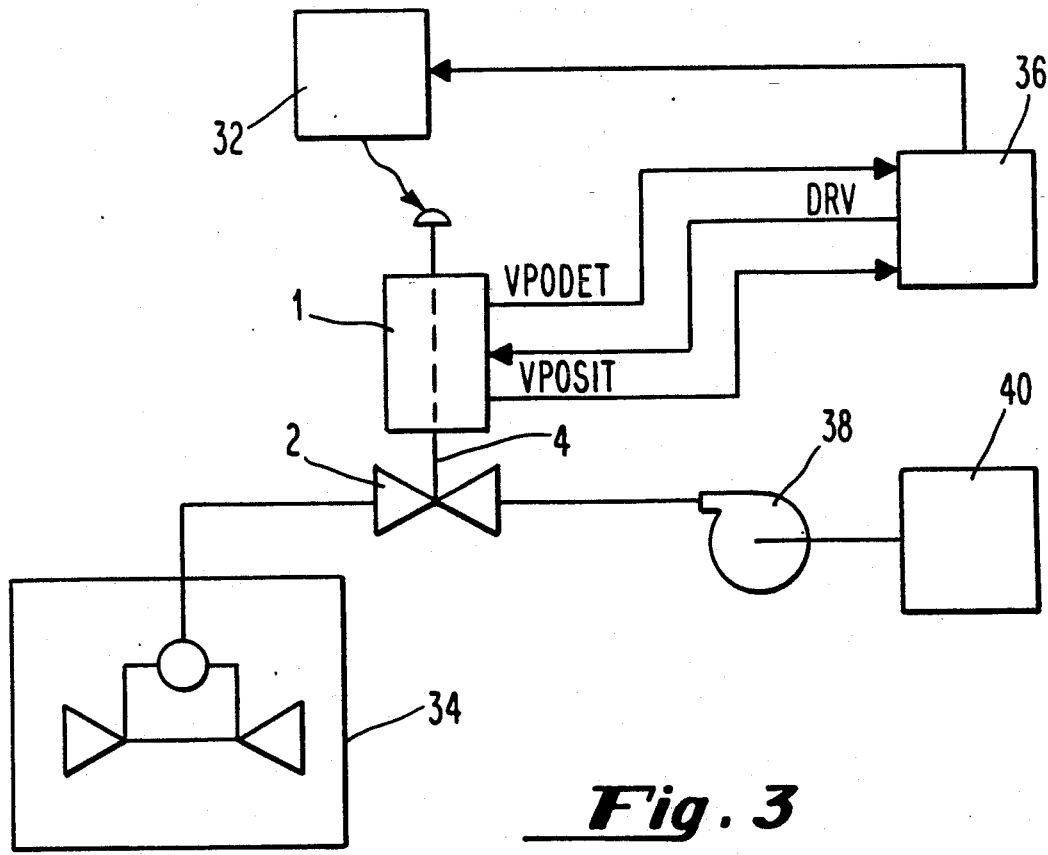
FIG. 3 is a schematic diagram of a turbine system employing an automatic valve positioner and valve position sensing circuit in accordance with the present invention.

Referring now to FIG. 3, there is depicted a schematic representation of a turbine system incorporating the present invention. According to the invention, such a system comprises a turbine 34, valve 2, fuel pump 38 and fuel tank 40. As shown, fuel flow from the storage tank 40 to the turbine 34 is controlled by the pump 38 and valve 2. The valve is opened and closed automatically by a valve positioner 32 coupled to the valve stem 4. A valve position sensor 1 according to the present invention is coupled to the stem 4 to detect the valve's position as described above.

The sensor 1 signals VPODET and VPOSIT are coupled as inputs to processing circuitry 36. The processing circuitry 36 is suitably a digital computer or other means for comparing the fault detection signal VPODET with its expected range of values and providing an indication when a fault exists. For example, the processing means 36 can sound an alarm to notify the system operator, or provide a control signal to the controller 32. In addition, in the event that the sensor 1 comprises an LVDT, the processing means 36 can also provide a drive signal DRV to the LVDT's primary winding. The controller 32 preferably is programmed to respond to a control signal from processor 36 by either closing the valve, or at minimum refraining from opening it further until the fault is corrected. The invention, of course, is not limited to any particular system in which the invention is incorporated. Rather, the invention, or most significant aspect of the invention, is in the instantaneous detection of, and response to, faults in the sensing circuitry.

It is apparent that many modifications and variations of the present invention are possible in light of the above-described preferred embodiments. The scope of the invention is therefore intended to be limited only by the following claims.

I claim:

1. An apparatus for sensing the position of a valve and providing a first signal indicative of the valve's position and a second signal indicative of a fault in the apparatus, the apparatus comprising:
    a) position sensing means, operatively coupled to said valve, for providing first and second substantially linear signals, said linear signals each having an amplitude dependent upon the position of the valve, and wherein a sum of said linear signals remains within a predefined range of values in the absence of a fault, but deviates from said predefined range of values when a fault is present, said sum defining a fault detection signal;
    b) processing means coupled to said position sensing means (a) for receiving said substantially linear signals, summing said signals and determining whether a fault exists based upon a comparison of the sum (VPODET) with said predefined range, and providing a fault signal when a fault exists; and
    c) control means, coupled between the processing means (b) and the valve, and responsive to said fault signal, for automatically controlling the position of said valve;
    wherein, in the event of a fault, the valve position is controlled in accordance with a predefined plan.

2. Apparatus as recited in claim 1 wherein the position sensing means (a) comprises a linear variable differential transformer (LVDT)

3. Apparatus as recited in claim 1 in combination with a turbine system, wherein the valve controls the flow of a fluid in the turbine system.

4. Apparatus as recited in claim 1 further comprising storage means for storing said predefined range of values.

5. Apparatus as recited in claim 1 further comprising means for storing and executing a predefined set of steps in response to an indication that a fault exists.

6. Apparatus as recited in claim 5 wherein the predefined set of instructions include moving the valve towards a closed position in the event of a fault.

7. Apparatus as recited in claim 1 further comprising means for combining the first and second linear signals to produce a resultant signal indicative of the position of the valve.

8. Apparatus as recited in claim 2 further comprising means for driving the LVDT.

9. Apparatus as recited in claim 1 wherein said processing means b), in accordance with the fault detection signal VPODET, provides a substantially immediate indication when a fault occurs.

10. A turbine system comprising a turbine, a valve for controlling fuel or steam flow to the turbine, sensing means for sensing the position of said valve and for providing first signals which vary as a function of said position, said system further characterized by:
   a) means coupled to said sensing means for deriving a second signal which is normally constrained within a predefined range of values in the absence of a fault in said sensing means;
   b) fault means for generating a fault signal when said second signal is outside of said range; and
   c) control means, coupled to said valve, and responsive to said fault signal, for automatically controlling the position of said valve;
   wherein, in the event of a fault, said valve is controlled in accordance with a predefined plan.

11. A valve position sensor comprising a linear variable differential transformer (LVDT) and circuit means for providing a first signal (VPOSIT) indicative of the valve position, and a second signal (VPODET) indicative of a fault in the position sensor, the LVDT comprising a primary winding, a ferrite core, and first and second secondary windings electrically coupled to the primary winding, the ferrite core being movably coupled to the valve to vary the mutual inductance between the primary and secondary windings in accordance with the position of the valve; the circuit means comprising:
   a) means for exciting the primary winding with an ac signal;
   b) first demodulator means coupled to the first secondary winding for providing a signal (LVDTA) indicative of the rms value of a current induced in the first secondary winding;
   c) second demodulator means coupled to the second secondary winding for providing a signal (LVDTB) indicative of the rms value of a current induced in the second secondary winding;
   d) first summing means for computing the signal VPOSIT=A(LVDTA-LVDTB)+B, wherein A and B are constants and VPOSIT is indicative of the position of the valve; and
   e) second summing means for computing the signal VPODET=LVDTA+LVDTB, wherein any deviation of VPODET from a predefined range of values is indicative of a fault in the position sensor.

12. Apparatus of claim 11 wherein said first and second secondary windings are arranged in series opposition.

13. Apparatus of claim 11 further comprising an inverter coupled between the second demodulation means and the first summing means, for inverting the LVDTB signal prior to its being input to the first summing means.

14. Apparatus of claim 11 wherein the first signal (LVDTA) varies substantially linearly from a maximum value when the valve is in a fully closed position to a minimum value when the valve is in a fully open position, and the second signal (LVDTB) varies substantially linearly from the minimum value when the valve is in the fully closed position to the maximum value when the valve is in the fully open position.

15. Apparatus of claim 14 wherein the sum of said first and second linear signals (LVDTA+LVDTB) is approximately a predefined constant substantially independent of the valve position and equal to the maximum value.

16. Apparatus of claim 15 further comprising means for comparing the sum of said first and second linear signals with said predefined range of values and, when said sum deviates from said predefined range, indicating that a fault has occurred.

17. In a valve position sensor comprising a primary winding, a ferrite core, and first and second secondary windings electrically coupled to the primary winding, the ferrite core being movably coupled to the valve to vary the mutual inductance between the primary and secondary windings in accordance with the position of the valve, a method for providing a first signal indicative of the valve position, and a second signal indicative of a fault in the position sensor, the method comprising:
   a) exciting the primary winding with an ac signal;
   b) providing a signal (LVDTA) indicative of the rms value of a current induced in the first secondary winding;
   c) providing a signal (LVDTB) indicative of the rms value of a current induced in the second secondary winding;
   d) computing the signal VPOSIT=A(LVDTA LVDTB)+B, wherein A and B are constants and VPOSIT is indicative of the position of the valve; and
   e) computing the signal VPODET=LVDTA+LVDTB, comparing VPODET to a predefined range of values and indicating that a fault has occurred upon the deviation of VPODET from the predefined range of values.

18. Method as recited in claim 17 further comprising the step of preventing the valve from further opening while the fault continues to exist, as indicated in step (e).

* * * * *